United States Patent
Bernoth et al.

(10) Patent No.: US 10,979,333 B2
(45) Date of Patent: Apr. 13, 2021

(54) OFFLINE, REALTIME, AND HISTORIC MONITORING OF DATA PACKETS

(71) Applicant: International Business Machines Corporation, Armonk, NY (US)

(72) Inventors: Andrew J. Bernoth, Lara (AU); Daniel J. Martin, Pawling, NY (US); Sandeep R. Patil, Pune (IN); Piyush Sarwal, Leawood, KS (US); Riyazahamad M. Shiraguppi, Pune (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 14/709,587

(22) Filed: May 12, 2015

(65) Prior Publication Data

US 2016/0337225 A1 Nov. 17, 2016

(51) Int. Cl.
*H04L 29/08* (2006.01)
*H04L 12/26* (2006.01)

(52) U.S. Cl.
CPC .............. *H04L 43/10* (2013.01); *H04L 67/04* (2013.01); *H04L 67/10* (2013.01); *H04L 67/12* (2013.01); *H04L 67/18* (2013.01); *H04L 67/22* (2013.01)

(58) Field of Classification Search
CPC .......... H04L 43/10; H04L 67/04; H04L 67/12
USPC ........................................................ 709/224
See application file for complete search history.

(56) References Cited

U.S. PATENT DOCUMENTS

| | | | |
|---|---|---|---|
| 6,920,112 B1 | 7/2005 | McCloghrie et al. | |
| 7,257,081 B2 | 8/2007 | Rajan et al. | |
| 7,769,851 B1 | 8/2010 | Guruswamy et al. | |
| 8,107,502 B2 | 1/2012 | Darras et al. | |
| 8,125,908 B2 | 2/2012 | Rothstein et al. | |
| 8,264,976 B2 | 9/2012 | Robinson | |
| 8,451,731 B1 | 5/2013 | Lee et al. | |
| 2005/0188081 A1 | 8/2005 | Gibson et al. | |
| 2006/0072474 A1 | 4/2006 | Mitchell | |
| 2006/0274760 A1 | 12/2006 | Loher | |
| 2007/0171085 A1* | 7/2007 | Imai .................... | H04L 12/2697 340/657 |
| 2009/0002195 A1* | 1/2009 | Horvitz ................ | G08G 1/0104 340/934 |
| 2011/0064091 A1 | 3/2011 | Darras et al. | |
| 2013/0315265 A1 | 11/2013 | Webb, III et al. | |
| 2014/0029446 A1 | 1/2014 | Loher | |

OTHER PUBLICATIONS

Fraleigh, et al.; "Packet-Level Traffic Measurements from a Tier-1 IP Backbone".

(Continued)

*Primary Examiner* — Adnan M Mirza
(74) *Attorney, Agent, or Firm* — Alexander G. Jochym

(57) ABSTRACT

A request to monitor a data packet to be transmitted from a first location to a second location over a first network is received. A projected time for the transmission of the data packet from the first location to the second location is determined. Responsive to determining the projected time, whether the data packet arrived at the second location after the projected time plus a variance is determined.

18 Claims, 5 Drawing Sheets

(56) References Cited

OTHER PUBLICATIONS

Hogg, Scott; "Using SDN to Create a Packet Monitoring System": "Packet-level Monitoring Use Case with Cisco XNC and Monitor Manager"; Core Networking and Security; Networkworld; Copyright 2014 Network World; <http://www.networkworld.com/article/2226003/cisco-subnet/using-s . . . >.

Zhao, Zhonghua, et al.; "NSSN: A Network Monitoring and Packet Sniffing Tool for Wireless Sensor Networks"; IEEE; Copyright 2012 IEEE; pp. 537-542.

"The Route Explorer System"; Packet Design; Copyright 2014 Packet Design, LLC; <http://www.packetdesign.com/products/route-explorer>.

* cited by examiner

OFFLINE, REALTIME, AND HISTORIC MONITORING OF DATA PACKETS

BACKGROUND

The present invention relates generally to the field of data packet monitoring, and more particularly to monitoring of cloud environment by tracking expected delivery time of packets within a system.

Tier based management of infrastructure has been evolving for over a decade. These monitoring solutions include at least the following elements. First, an agent, which runs in the network elements (i.e. lower tier). Data describing the network equipment (e.g., number of packets received in a particular link, number of packets dropped in a particular link, etc.) is collected in a virtual database. Second, a manager, which is an overarching entity residing in application (i.e. upper tier) polls the agents based upon the polling period and collects data that is in the virtual database. This data is used to create both historic and online reports along with appropriate alarms being raised in case of traffic congestion, link failures, etc. Additionally, the agent can send traps for faster processing of the critical details by the manager.

SUMMARY

Embodiments of the present invention include a method, computer program product, and system for monitoring a data packet in a distributed computing environment. In one embodiment, a request to monitor a data packet to be transmitted from a first location to a second location over a first network is received. A projected time for the transmission of the data packet from the first location to the second location is determined. Responsive to determining the projected time, whether the data packet arrived at the second location after the projected time plus a variance is determined.

DETAILED DESCRIPTION

Figure 1:
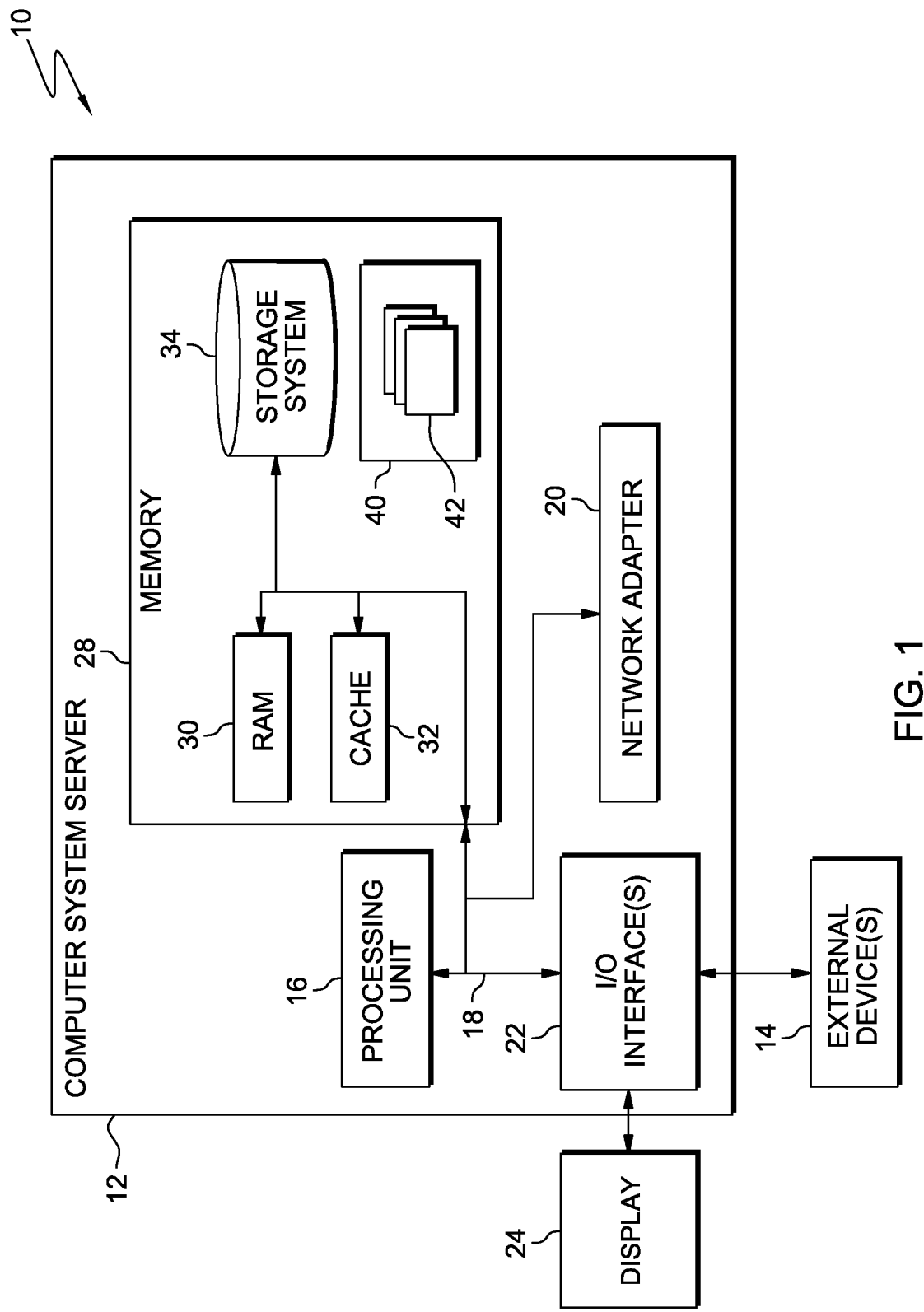
FIG. 1 depicts a cloud computing node, in accordance with an embodiment of the present invention.

Some embodiments of the present invention recognize that current tier based management of infrastructure elements that follow a "bottom up" approach are intrusive and contribute to the overheads of traffic specific to monitor. As the number of network elements increase, the monitoring needs increase and therefore the intrusive traffic increases. Additionally, current tier based management of infrastructure elements lack in differentiated treatment of monitoring in cloud based environments where a tenant might want a close monitoring of packets created by a process which is critical to a Service Level Agreement (SLA). However, current tier based management infrastructure elements that follow a "top up" approach capture the events based upon the configurations and this has the disadvantage of lack of open interfaces. In cloud based distributed environments the resources and infrastructure are shared and the process or its components get executed in various available nodes and there is a need to trade the propagation of the Internet Protocol (IP) packet comprising critical processes.

Embodiments of the present invention offer an integrated offline packet tracking mechanism for packets in tagged processes. Embodiments of the present invention include a program termed Offline Monitoring Assistant (OMA). OMA includes a tag enabler that enables the tagging of processes/tasks to be monitored. OMA also provides an out-of-band monitoring switch which exposes interfaces for various categories including, but not limited to, Geospatial monitor links, Wireless (3G, 4G, etc.) out-of-band links, physical out-of-band links, and GPS (Global Positioning Satellites). Geospatial monitoring links are monitoring channels enabled offline through geospatial satellites (i.e., monitoring packets are routed via Satellite links.)

Embodiments of the present invention overcome the previously discussed disadvantages by enabling combined benefits of differentiated treatment for monitoring of packets for the tenants through a non-intrusive location based mechanism enable through multiple categories of interfaces. Additionally, embodiments of the present invention provide a flexible monitoring system enable for various dedicated and cloud based offerings including, but not limited to, software as a service, infrastructure as a service, and platform as a service.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The present invention will now be described in detail with reference to the Figures.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
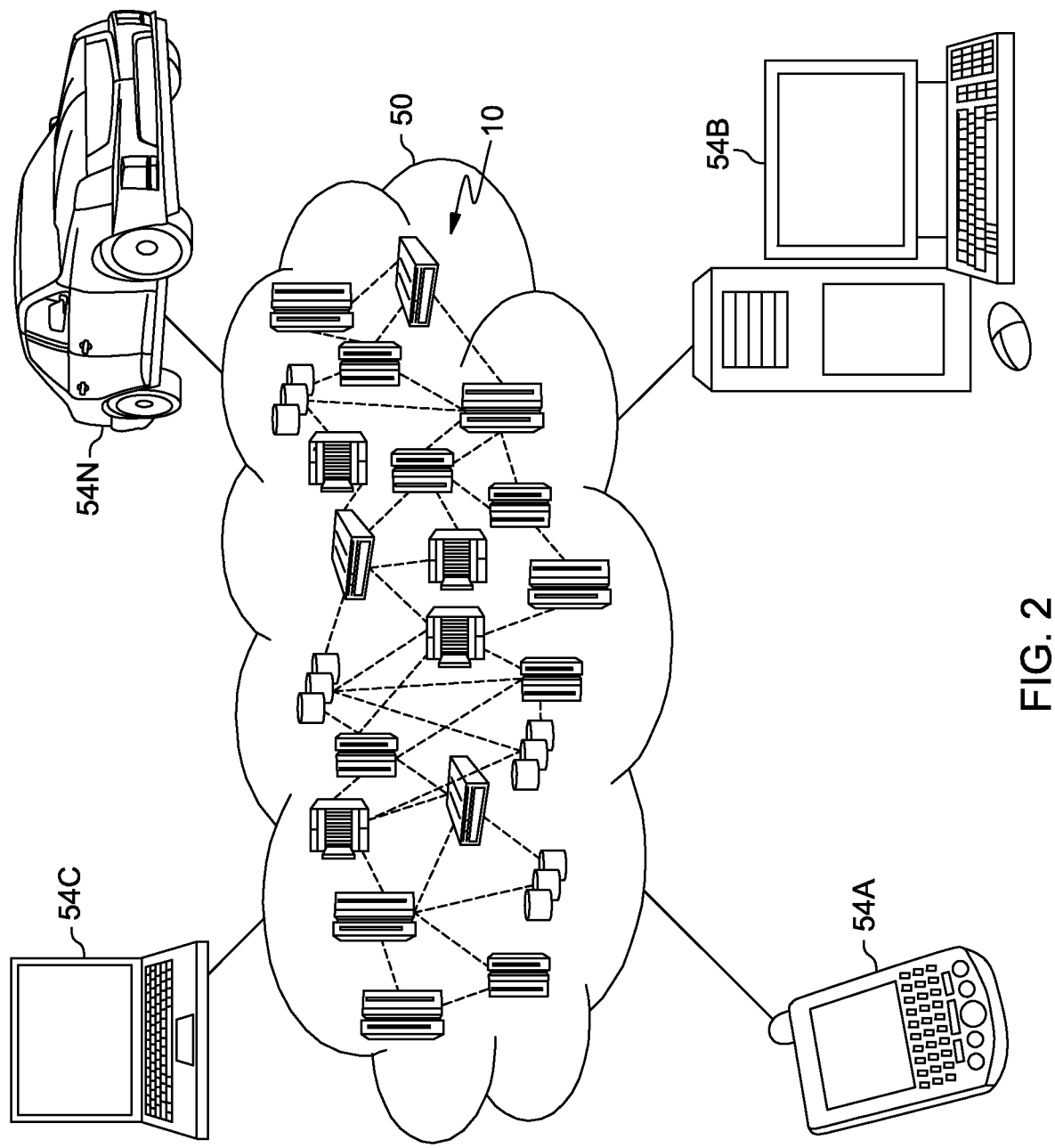
FIG. 2 depicts a cloud computing environment, in accordance with an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
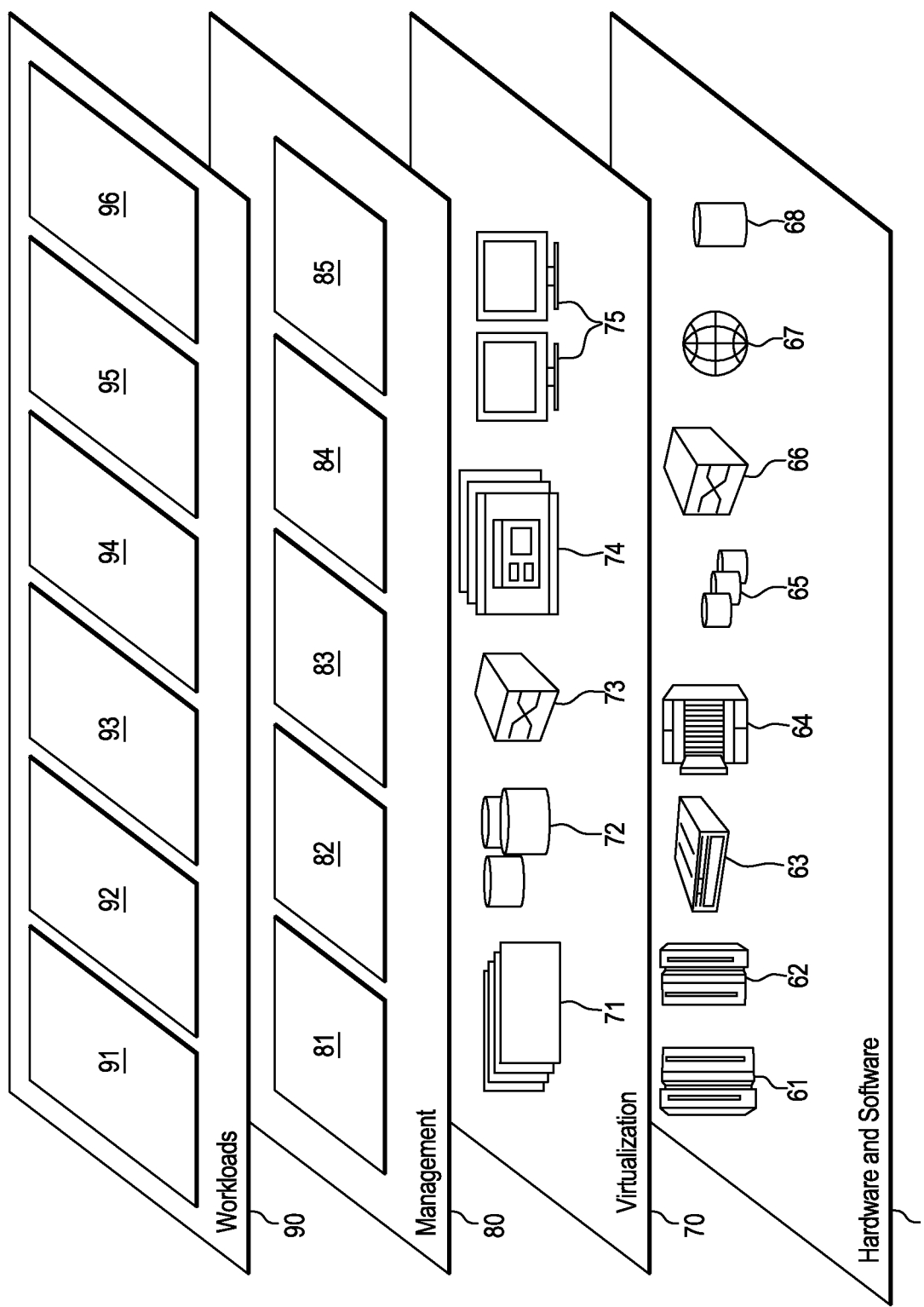
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and packet monitoring 96.

Figure 4:
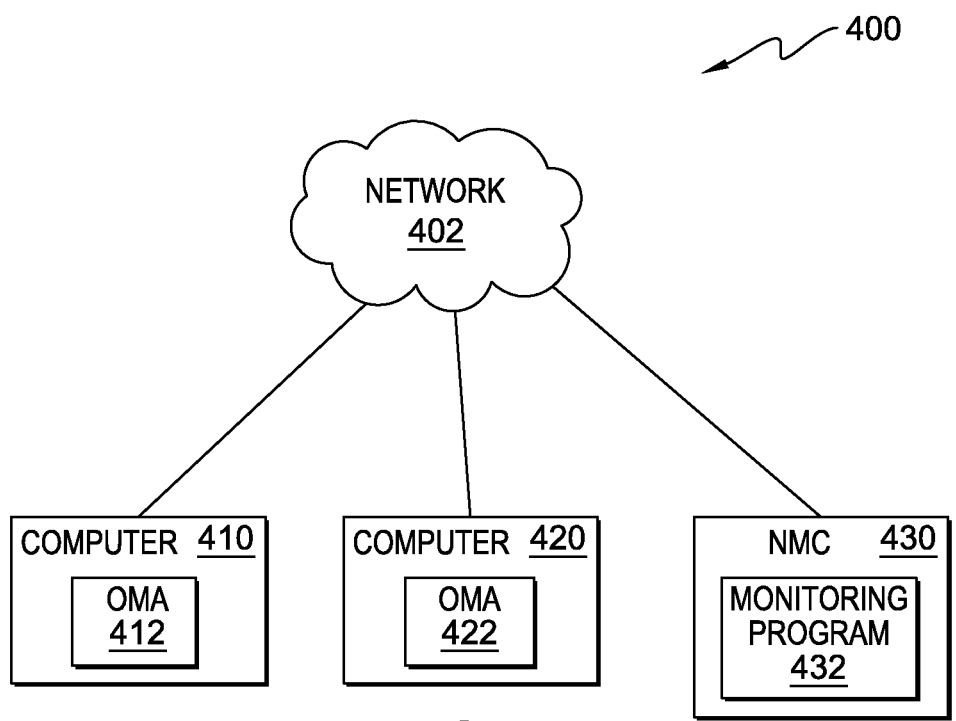
FIG. 4 depicts a functional block diagram of a data processing environment, in accordance with an embodiment of the present invention.

FIG. 4 is a functional block diagram illustrating a data processing environment, generally designated 400, in accordance with one embodiment of the present invention. FIG. 4 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 400 includes computer 410, computer 420, and network management center (NMC) 430 interconnected over network 402. Network 402 can be, for example, a local area network (LAN), a telecommunications network, a wide area network (WAN) such as the Internet, or any combination of the three, and include wired, wireless, or fiber optic connections. In general, network 402 can be any combination of connections and protocols that will support communications between computer 410, computer 420, and any other computer connected to network 402, in accordance with embodiments of the present invention.

In example embodiments, computer 410 can be a laptop, tablet, or netbook personal computer (PC), a desktop computer, a personal digital assistant (PDA), a smart phone, or any programmable electronic device capable of communicating with any computing device within data processing environment 400. In certain embodiments, computer 410 collectively represents a computer system utilizing clustered computers and components (e.g., database server computers, application server computers, etc.) that act as a single pool of seamless resources when accessed by elements of data processing environment 400, such as in a cloud computing environment. In general, computer 410 is representative of any electronic device or combination of electronic devices capable of executing computer readable program instructions. Computer 410 can include components as depicted and described in detail with respect to cloud computing node 10, as described in reference to FIG. 1, in accordance with embodiments of the present invention. Computer 420 and NMC 430 are substantially similar to computer 410 and have substantially similar components. Computer 410, computer 420, and NMC 430 can be nodes that are part of cloud computing environment 50.

In an embodiment, computer 410 includes OMA 412. OMA 412 is a program, application, or subprogram of a larger program that includes a tag enabler and offline monitoring switch. In an embodiment, OMA 412 allows for a user to tag or indicate layer 2 or layer 3 data packets that are parts of processes to be monitored. Data packets, or network packets, are formatted units of data carried by a packet-switched network. The packets are enclosed in one or more wraps of information that help to identifying the piece of data and route the piece of data to its correct destination. Layer 2 is the data link layer that provides node-to-node data transfer including a reliable link between two directly connected nodes, by detecting and possibly correcting errors that can occur in the physical layer. The physical layers of Ethernet and other local-area networks (i.e. network 402) can be for example Token Ring local area network, Fiber Distributed Data Interface (FDDI), ITU-T G.hn, and IEEE 802.11 (Wi-Fi), as well as personal area networks such as Bluetooth and IEEE 802.15.4. Layer 3 is the network layer that provides the functional and procedural means of transferring variable length data sequences from one node (or computer) to another node (or computer) that is connected to the same network. In an alternative embodiment, OMA 412 can tag or indicate any other layer data packet types. In an embodiment, a process is a piece of code or capability intended to perform the desired functionality. A process can be at various levels of abstraction (i.e., Tasks). For example, a process can check if a customer has paid a bill or check if a customer is a member of a group. In an alternative embodiment, processes can be aggregated to a higher level process. For example, a process to validate customer details which includes both checking if the customer has paid a bill and if the customer is a member of a group. In an alternative embodiment, the process can be a sub-process or task (i.e. a smaller subset of a process).

In some embodiments, OMA 412 allows for a user to assign Service Level Agreement (SLA) categories for processes, sub-processes or tasks. In other words, a user can indicate an acceptable SLA for a process (i.e., a speed the process must be completed, a time the process must be completed, etc.) including a variation that is allowed for the process before an alarm should be indicated. OMA 412 also includes an offline monitoring switch that exposes interfaces for various categories (e.g., geospatial monitoring, wireless (3G/4G and other) offline links, physical offline links, GPS, etc.) so that OMA can tag different processes. OMA 412 captures the packet locations at the egress of the interfaces (just before the packet leaves the interface) and communicates the location with the out-of-band communication links (i.e., satellite, wireless, or other wireline media). OMA 412 forward this packet location information to NMC 430 and specifically to monitoring program 432 via network 402.

Computer 420 includes OMA 422 and OMA 422 is substantially similar to OMA 412.

In one embodiment, NMC 430 includes monitoring program 432. Monitoring program 432 is a program, application, or subprogram of a larger program that monitors data packets as they interact in data processing environment 400. In an embodiment, monitoring program 432 can monitor data packets that pass between computer 410 and computer 420. In an alternative embodiment, monitoring program can monitor data packets that pass between any computer(s) (not shown) that can interact with network 402. In an alternative embodiment, monitoring program 432 can be located anywhere that can interact with network 402 but monitor data packets that move through network 402.

Monitoring program 432 receives information about data packets as they traverse through the network elements (i.e., network 402) and the network elements capture the routing information, such as ingress and egress from interfaces, and monitoring program 432 adds the routing information to the tagging information attached to the data packets. Monitoring program 432 can include a predictive algorithm that determines the expected time of arrival of the data packet using the starting location for the data packet, the next location for the data packet, and the network devices the data packet must travel via to get from the starting location to the next location. In an embodiment, monitoring program 432 can raise an alarm if the data packet does not reach the next location within a predicted time while allowing some variation based upon the network devices used. The alarm can include an alert for an outage of a network device or an alert for congestion in a network device or series of network devices along with an indication that the data packet should find an alternate path in the network. In an embodiment, if the path of network devices that the data packet is traveling via has previously been reliable and there is an indication that there is communications interference monitoring program 432 can alert the user that there is possibly a lawful or unlawful wiretapping. Wiretapping can be a miscreant act to view the packets enabled through copying the packet or intrusion as a proxy within the packet flow path.

In any embodiment, OMA 412, OMA 422 and monitoring program 432 can include a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computer, GUIs were introduced in reaction to the perceived steep learning curve of command-line interfaces, which required commands to be typed on the keyboard. The actions in GUIs are often performed through direct manipulation of the graphics elements. For example, client application can be a web browser, a database program, etc.

Figure 5:
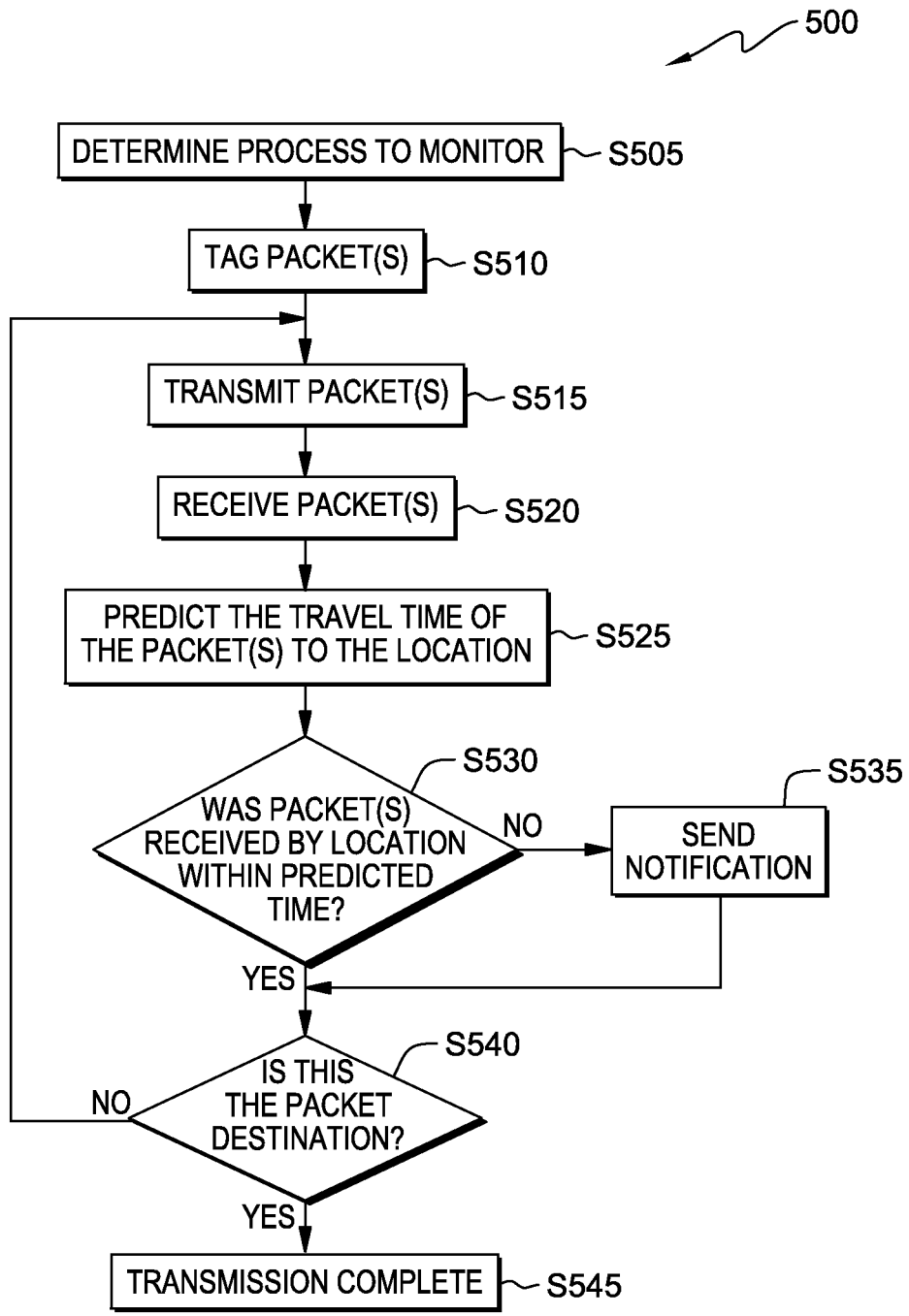
FIG. 5 depicts a flowchart of operational steps of a program for tagging and monitoring data packets in a cloud environment, in accordance with an embodiment of the present invention.

FIG. 5 is a flowchart of workflow 500 depicting operational steps for tagging and monitoring data packets in a cloud environment, in accordance with an embodiment of the present invention. Workflow 500 represents the operational steps to perform packet monitoring 96 in workloads layer 90. In one embodiment, the steps of the workflow are performed by OMA 412 and OMA 422. In an alternative embodiment, the steps of the workflow are performed by monitoring program 432. Alternatively, steps of the workflow can be performed by any other program while working with OMA 412, OMA 422 and monitoring program 432. In a preferred embodiment, a user, via a user interface discussed previously, can invoke workflow 500 upon determining that they would like to tag and monitor data packets in a cloud environment. In an alternative embodiment, workflow 500 can be invoked automatically under the control of another program, for example, upon a business process modeler creating a process model that includes monitoring at the time of execution, OMA 412, OMA 422, or monitoring program 432 can begin a step in workflow 500.

Monitoring program 432 determines a process to monitor (step S505). In an embodiment, monitoring program 432 can be notified by a user (i.e. a network administrator, admin, etc.), via user interface, discussed previously, of a process to monitor. Additionally, the process can be a sub-process or task (i.e. a smaller subset of a process). Each process to be monitored is made up of a number of packets or data packets (e.g., layer 2 and layer 3). In an alternative embodiment, a user, via a business process modeler (not shown), can create a process model that can have an SLA for the process and the business process modeler can indicate to monitoring program 432 that the process should be monitored. The SLA can be specific for an individual process or can be for all processes. Additionally, the SLA can include a variance that, if exceeded, can indicate an issue, raise an alarm, or send a notification. In yet another embodiment, a user of OMA 412 or OMA 422, via user interface discussed previously, can tag processes occurring on computer 410 or computer 420, respectively, and monitoring program 432 will be notified by OMA 412 and OMA 422 of the processes to be monitored. An example process can be transferring data from computer 410 to computer 420.

OMA 412 tags packet(s) (step S510). For example, OMA 412 tags packet(s) of the determined process to monitor that are found on computer 410. Additionally, OMA 422 tags packet(s) of the determined process to monitor that are found on computer 420. Tagging a packet(s) indicates that network elements should monitor the ingress and egress movements of said packets and this ingress and egress information is added to the packet information. In other words, OMA 412 and OMA 422 indicates that as the packets traverse (i.e., ingress or egress) from a computer (i.e., network element), the network elements (not shown) on the computer capture the routing information, such as timing and location, process ID, or tenant ID in a cloud environment, and then adds this information to the packets. Additionally, the routing information is indicated to be forwarded to monitoring program 432 on NMC 430 via network 402. For example, if a packet is transferred from computer 410 to computer 420, monitoring program 432 can indicate to OMA 412 and OMA 422 that the packet should be tagged (i.e., monitored).

The computers transmit the packet(s) (step S515). In other words, computer 410 transmits the packet(s) of the determined process to be monitored to its next destination. In an embodiment, computer 410 transmits the packet to computer 420 via network 402. For example, as the packet leaves or egresses computer 410 and enters network 402, OMA 412 adds to the packet the timing and location information, for example, the packet left computer 410 at 9:04:33.22 A.M. Eastern Time. OMA 412 also forwards the information to monitoring program 432 via network 402. In an alternative embodiment, a packet can stop at any number of network locations as it is transmitted from computer 410 to computer 420 and ingress/egress information is added to the packet regarding each of the any number of network locations. In an embodiment, the computer can transmit one packet and the packet has timing and location information added to it. In an alternative embodiment, the computer can transmit multiple packets and each packet has the timing and location information added to it.

The computer receives the packet(s) (step S520). In other words, computer 420 receives the packet(s) of the determine process to be monitored. In an embodiment, computer 420 receives the packet from computer 410 via network 402. For example as the packet enters computer 420 and leaves network 402, OMA 422 adds to the packet the timing and location information, for example, the packet entered computer 420 at 9:04:33.25 A.M. Eastern Time. OMA 422 also forwards the information to monitoring program 432 via network 402. In an embodiment, computer 420 can be the final destination of the packet. In an alternative embodiment, computer 420 can be a network element that the packet has to travel via before reaching a final destination computer (not shown). In an embodiment, the computer can receive one packet and the packet has timing and location information. In an alternative embodiment, the computer can receive multiple packets and each packet has the timing and location information.

Monitoring program 432 predicts the travel time of the packet(s) to the location (step S525). In other words, monitoring program 432 predicts the travel time between two locations of packet(s) of the determined process to be monitored that monitoring program has tagged. For example, monitoring program 432 predicts the travel time of a packet that was tagged and then sent from computer 410 to computer 420 via network 402. Monitoring program 432 determines that the size of the packet is 1500 Bytes which is equal to 12000 bits. The packet will travel via network 402 between computer 410 and computer 420 and the network is a 2 Mbps (megabits per second) or 2 million bits per second. Therefore, the predicted travel time is 12000 bits divided by 2 million bits per second, or 0.006 seconds. In an alternative embodiment, predictive algorithms for calculating travel time between two network locations for a piece of data, as known in the art, can be used.

Monitoring program 432 determines if the packet(s) were received by the location within the predicted time (decision block S530). In other words, monitoring program 432 compares the predicted travel time of the packet to the location determined in step S525 to the actual time taken to between when the packet was transmitted (step S515) and when the packet was received (step S520). Additionally, monitoring program 432 allows for some variance (e.g., 10%, ±0.001 seconds, etc.) of the predicted travel time. The variance is received by monitoring program 432 via a user, using user interface, discussed previously. For example, monitor program predicted the travel time of a packet between computer 410 and computer 420 via network 402 would be 0.004 seconds. The actual travel time based on the time the packet was transmitted and the packet was received was 0.03 seconds. A user indicated that the travel time can have a variance up to 10%. In other words, the predicted travel time can be anywhere up to 10% more than 0.004 seconds for a total of 0.0044 seconds. Here, the actual travel time (0.03 seconds) was more than the predicted travel time with the variance (0.0044 seconds).

If the packet was not received by the location within the predicted travel time (decision block S530, no branch), monitoring program 432 sends a notification (step S523). Monitoring program 432 can send the notification to the user who indicated they would like the packets monitored. In an alternative embodiment, monitoring program 432 can send a notification to a network administrator or the like that monitors network 402, computer 410, or computer 420. In yet another embodiment, monitoring program 432 can send a notification to any user that has control of network 402, computer 410, computer 420, or any processes that use these devices. The notification can be an alert for an outage (i.e., the packet never actually arrives) or if multiple packets are delayed beyond the variation the notification could indicate congestion. Additionally, the notification can automatically indicate to another program (not shown) that the packets should use a different network route to travel from computer 410 to computer 420. Further, should the delay in the transmission of the packets be on going, monitoring program can include a notification that the network path can be degraded (i.e. a physical issue). Similarly, if the network path that the packets are travelling has known to be reliable for an extended period of time and the network equipment indicates a loss of signal strength, the notification can include an indication of communication interference such as would happen if an electrical or optical sign is split for either lawful or unlawful wire tapping.

If the packet was received by the location within the predicted travel time (decision block S530, yes branch), monitoring program 432 determines if this is the packet destination (decision block S540). In other words, is the packet at its final destination or does the packet need to be transmitted to another location. If this is not the packet destination (decision block S540, no branch), then processing proceeds to transmit the packet (step S515). If this is the packet destination (decision block S540, yes branch), then processing proceeds to transmission complete (step S545). In other words the packet is at the final destination and does not need to be transmitted and monitoring program 432 ceases to monitor the packet.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for monitoring a data packet in a distributed computing environment, the method comprising the steps of:
    receiving, by one or more computer processors, a request to monitor a data packet to be transmitted from a first location to a second location over a first network;
    tagging, by one or more computer processors, the data packet, wherein a tagged packet has a timing information and a location information added to the data packet;
    determining, by one or more computer processors, an actual time of transmission based on the timing information and the location information;
    determining, by one or more computer processors, a projected time for the transmission of the data packet from the first location to the second location; and
    responsive to determining the projected time, determining, by one or more computer processors, whether the actual time of transmission is within the projected time plus a variance.

2. The method of claim 1, further comprising:
    responsive to determining the actual time of transmission is not within the projected time plus a variance, issuing, by one or more computer processors, a notification.

3. The method of claim 1, wherein the step of responsive to determining the projected time, determining, by one or more computer processors, whether the actual time of transmission is within the projected time plus a variance comprises:
    receiving, by one or more computer processors, from the first location over a second network, a time the data packet left the first location, wherein the time the data packet left the first location is determined from the timing information;
    receiving, by one or more computer processors, from the second location over the second network, a time the data packet arrived at the second location, wherein the time the data packet arrived at the second location is determined from the timing information; and
    determining, by one or more computer processors, whether the actual time of transmission is within the projected time plus a variance.

4. The method of claim 3, wherein the second network is one or more of the following: a geospatial monitor link, wireless out-of-band links, physical out-of-band links, global positioning satellites, or geospatial satellites.

5. The method of claim 3, wherein the second network is separate from the first network.

6. The method of claim 1, wherein the data packet is a layer 2 data packet or a layer 3 data packet.

7. A computer program product for monitoring a data packet in a distributed computing environment, the computer program product comprising:
    one or more computer readable storage media; and
    program instructions stored on the one or more computer readable storage media, the program instructions comprising:
    program instructions to receive a request to monitor a data packet to be transmitted from a first location to a second location over a first network;
    program instructions to tag the data packet, wherein a tagged packet has a timing information and a location information added to the data packet;
    program instructions to determine an actual time of transmission based on the timing information and the location information;
    program instructions to determine a projected time for the transmission of the data packet from the first location to the second location; and
    program instruction to, responsive to determining the projected time, determine whether the actual time of transmission is within the projected time plus a variance.

8. The computer program product of claim 7, further comprising program instructions, stored on the one or more computer readable storage media, to:
    responsive to determining the actual time of transmission is not within the projected time plus a variance, issue a notification.

9. The computer program product of claim 7, wherein the program instructions to, responsive to determining the projected time, determine whether the actual time of transmission is within the projected time plus a variance comprises:

program instructions to receive from the first location over a second network, a time the data packet left the first location, wherein the time the data packet left the first location is determined from the timing information;

program instructions to receive from the second location over a second network, a time the data packet arrived at the second location, wherein the time the data packet arrived at the second location is determined from the timing information; and program instructions to determine whether the actual time of transmission is within the projected time plus a variance.

10. The computer program product of claim 9, wherein the second network is one or more of the following: a geospatial monitor link, wireless out-of-band links, physical out-of-band links, global positioning satellites, or geospatial satellites.

11. The computer program product of claim 9, wherein the second network is separate from the first network.

12. The computer program product of claim 7, wherein the data packet is a layer 2 data packet or a layer 3 data packet.

13. A computer system for monitoring a data packet in a distributed computing environment, the computer system comprising:

one or more computer processors;
one or more computer readable storage media; and
program instructions stored on the one or more computer readable storage media for execution by at least one of the one or more computer processors, the program instructions comprising:
program instructions to receive a request to monitor a data packet to be transmitted from a first location to a second location over a first network,
program instructions to tag the data packet, wherein a tagged packet has a timing information and a location information added to the data packet;
program instructions to determine an actual time of transmission based on the timing information and the location information;

program instructions to determine a projected time for the transmission of the data packet from the first location to the second location; and program instruction to, responsive to determining the projected time, determine whether the actual time of transmission is within the projected time plus a variance.

14. The computer system of claim 13, further comprising program instructions, stored on the one or more computer readable storage media for execution by at least one of the one or more computer processors, to:

responsive to determining the actual time of transmission is not within the projected time plus a variance, issue a notification.

15. The computer system of claim 13, wherein the program instructions to, responsive to determining the projected time, determine whether the actual time of transmission is within the projected time plus a variance comprises:

program instructions to receive from the first location over a second network, a time the data packet left the first location, wherein the time the data packet left the first location is determined from the timing information;

program instructions to receive from the second location over a second network, a time the data packet arrived at the second location, wherein the time the data packet arrived at the second location is determined from the timing information; and program instructions to determine whether the actual time of transmission is within the projected time plus a variance.

16. The computer system of claim 15, wherein the second network is one or more of the following: a geospatial monitor link, wireless out-of-band links, physical out-of-band links, global positioning satellites, or geospatial satellites.

17. The computer system of claim 15, wherein the second network is separate from the first network.

18. The computer system of claim 13, wherein the data packet is a layer 2 data packet or a layer 3 data packet.

* * * * *